Sept. 19, 1961 G. E. SUDEROW 3,000,205
METHOD AND APPARATUS FOR TESTING PIPE JOINT
Filed May 8, 1958 3 Sheets-Sheet 1

INVENTOR
GEORGE E. SUDEROW
BY Cushman, Darby & Cushman
ATTORNEYS

Sept. 19, 1961 G. E. SUDEROW 3,000,205
METHOD AND APPARATUS FOR TESTING PIPE JOINT
Filed May 8, 1958 3 Sheets-Sheet 2

INVENTOR
GEORGE E. SUDEROW
BY
Cushman, Darby & Cushman
ATTORNEYS

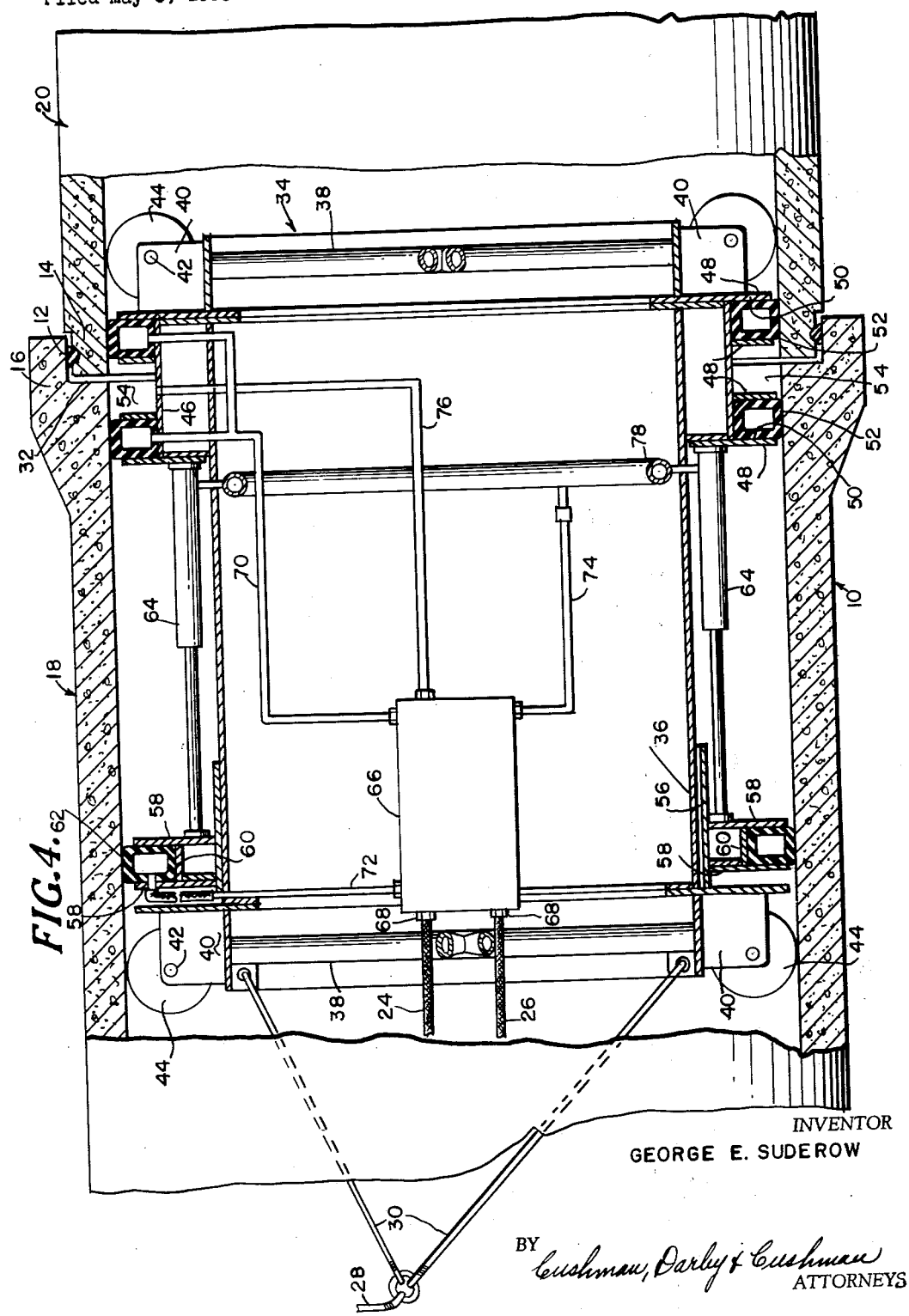

United States Patent Office 3,000,205
Patented Sept. 19, 1961

3,000,205
METHOD AND APPARATUS FOR TESTING PIPE JOINT
George E. Suderow, New York, N.Y., assignor to Delong Corporation, New York, N.Y., a corporation of Delaware
Filed May 8, 1958, Ser. No. 734,009
4 Claims. (Cl. 73—46)

This invention relates to a method and apparatus for testing a pipe joint for leakage. More particularly, this invention relates to a method and apparatus for testing a pipe joint for leakage immediately after two sections of pipe have been joined and before the pipe has been placed in service, i.e., before the fluid which the pipe is intended to convey is introduced thereinto. Although this invention finds its particular application in the testing of pipe joints that are made up under water, and although the invention will be described with reference to the testing of joints between sections of concrete pipe, it will be realized that the method and apparatus embodying this invention have other applications.

In the laying of pipe under water, by the successive joining of pipe sections, it usually is essential that each joint be tested for leakage immediately after it has been made up. This is particularly true of large concrete pipe sections, forming, for example, a sewer outfall, because of the difficulty of stopping leaks after the entire pipe has been laid. Pipe joint testing apparatus of the type with which this invention is concerned usually employs spaced packers adapted to be disposed within adjacent pipe sections and to seal with the interior walls thereof on opposite sides of the joint therebetween in order to define, with the joint, a closed testing chamber. Fluid under pressure is admitted to such chamber to test the joint for leaks. Known apparatus of this type, however, requires the use of a diver to manipulate the apparatus in order to test joints under water.

Accordingly, it is an object of this invention to provide a novel method and apparatus for the testing of pipe joints under water that does not require the use of a diver for underwater manipulations of the apparatus.

It is another object of this invention to provide apparatus of the type under consideration that may be installed in a pipe section above water, completely controlled from a station above water to test a joint made up under water between the section in which the apparatus is installed and another underwater section, and then retrieved for installation in and testing the joint between another pipe section and the first-mentioned section.

Other objects and advantages of the invention will become apparent from the following description and accompanying drawings in which:

FIGURE 4 is a view corresponding to FIGURE 2 but illustrating the pipe section which carries the apparatus connected to another section and the apparatus in position to test the joint between the sections, essentially as shown in FIGURE 1.

Figure 1:
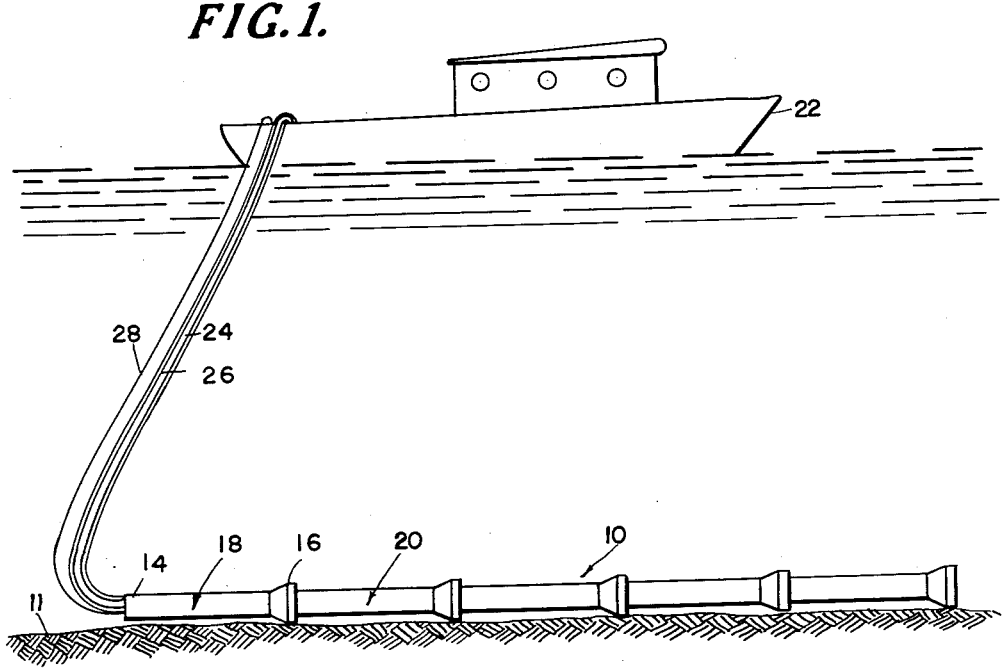
FIGURE 1 is a view illustrating the testing of an under water pipe joint with apparatus embodying this invention.
Figure 3:
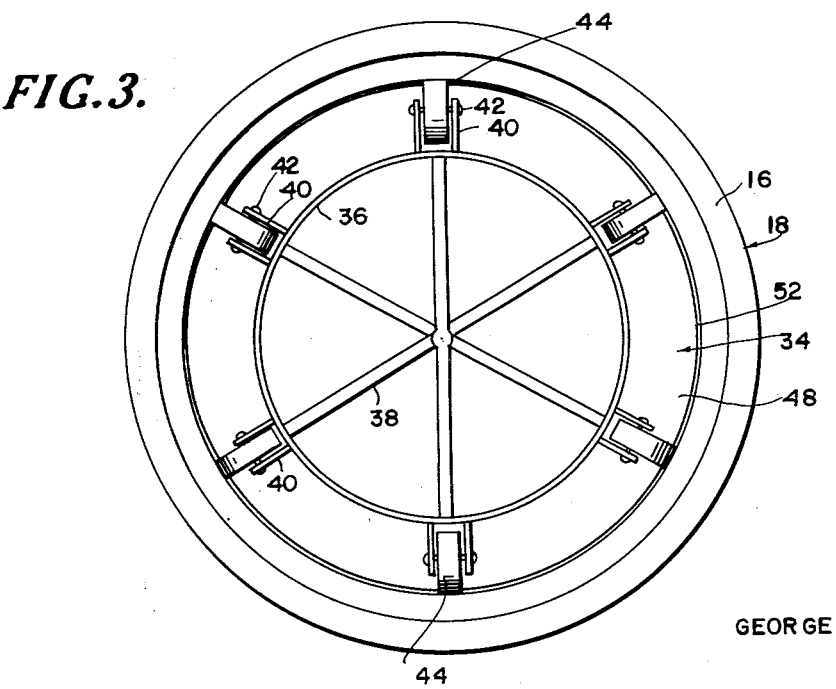
FIGURE 3 is a right hand end view of the assembly shown in FIGURE 2.

Referring now to the drawings, there is shown in FIGURE 1 a submerged incompleted pipe line 10 which is being laid along a marine bottom 11 by successively joining sections of pipe under water. In order to illustrate the application of this invention the pipe line 10 is shown as being of concrete with the sections being connected by bell and spigot joints that are sealed by a gasket 12, preferably of rubber or the like, carried in a circumferential groove on the spigot end 14 of a section and sealingly engaged with the opposed interior surface of the bell end 16 of an adjacent section, as best shown in FIGURE 4. The joint between the last-connected section 18 and the previously laid section 20 is shown being tested by apparatus best shown in FIGURES 2, 3 and 4. The actual test is conducted from a location above water, as from a vessel 22, to which conduits 24 and 26, usually in the form of hoses, extend from the testing apparatus through the open spigot end 14 of the last-connected pipe section 18.

Figure 2:
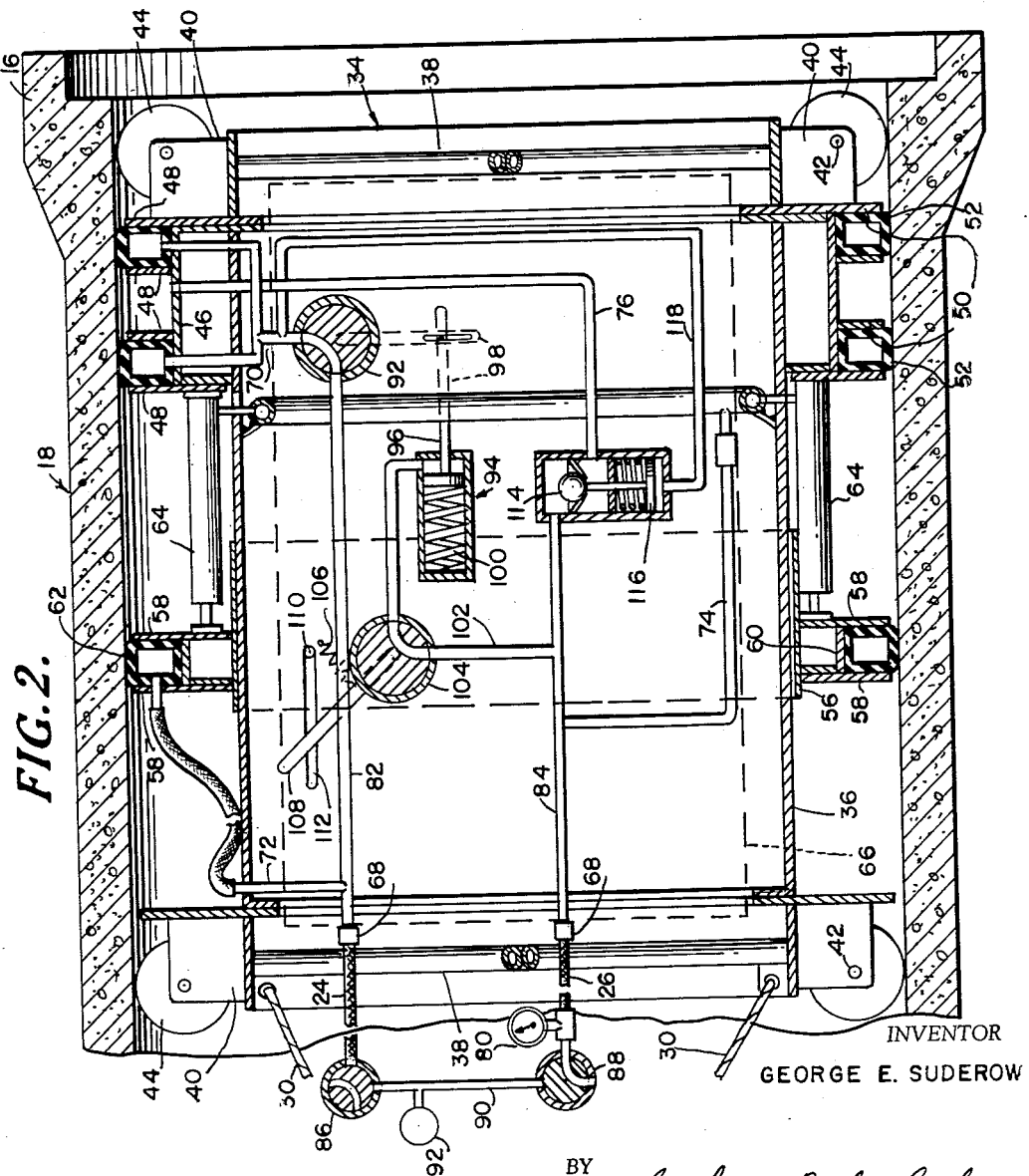
FIGURE 2 is an enlarged vertical sectional view illustrating the installation in a pipe section of testing apparatus embodying this invention prior to connecting the pipe section to another section, and including a diagrammatic showing of a control system.

In order to test the joint, the testing apparatus is installed in one end of the section 18 in this instance the bell end 16, while the section is above water, as shown in FIGURE 2, with the hoses 24 and 26 extending from the apparatus through the other end, i.e., the spigot end 14, of the section 18 for connection to testing equipment at the testing station, e.g., the vessel 22. For reasons later explained, a retrieving line 28 is attached, as by a bridle 30, to the apparatus and also extended through the end 14 of the section 18 to the vessel 22. The pipe section 18 then is lowered by appropriate equipment (not shown) from a barge or the like (not shown) and connected to the section 20 under water, as by pushing the bell end 16 of the section 18 over the spigot end 14 of the section 20. The joint 32 between the sections 18 and 20 is then tested for leakage as described hereinafter.

The testing apparatus includes a frame or carriage 34, here shown as being in the form of an elongated cylinder or shell 36 provided with interior stiffening spiders 38 adjacent its opposite ends. At its opposite ends the shell 36 also is provided with circumferentially spaced pairs of radially-outwardly extending brackets 40, each pair supporting a transverse axle 42 on which is journalled a wheel 44. In the embodiment shown in the drawings, six such wheels 44 are provided at each end of the carriage 34 in an arrangement that defines a circle of only slightly less diameter than the inner diameter of the sections of the pipe 10. Thus, the wheels 44 maintain the carriage 34 substantially centered in the pipe 10 while permitting it to be rolled along therethrough, irrespective of the position of the pipe or of the carriage therewithin.

Adjacent one end the carriage 34 has secured thereto an outer concentric sleeve 46 having a plurality of outer circumferential flanges 48, of an outer diameter only slightly less than the interior diameter of the pipe 10. Together the sleeve 46 and flanges 48 define a pair of axially-spaced outer circumferential channels 50. Disposed in each channel is a hollow inflatable ring, preferably of rubber or the like constituting a packer 52. The size, in radial section, of each packer 52 when inflated is greater than the depth of its corresponding channel 50, so that when the packers are inflated they expand into sealing engagement with the bottoms of their corresponding channels and the interior wall of the pipe 10. Additionally, when so inflated, the packers 52, together with the sleeve 46 and that portion of the interior wall of the pipe 10 extending between the packers, define an annular testing chamber 54, as shown in FIGURE 4.

Slidable on the shell 36 between the inner packer 52 and the other end of the carriage 34 is a short sleeve which constitutes a slide 56. Mounted on the slide 56 are a pair of circumferential flanges 58 connected, inwardly of their peripheries, by a transverse annular web or sleeve 60 to define another circumferential channel having a third hollow inflatable ring 62 disposed therein. The ring 62, by inflation, is expansible outwardly into engagement against the interior wall of the pipe 10 to constitute a gripper that prevents movement between the slide 56 and the pipe. A plurality of reciprocating fluid pressure motors 64 are connected between the slide 56 and the opposed flange 48 on the carriage 34 in order to move the carriage 34 axially of the slide 56 and, consequently, the packers 52 axially away from the slide, as later explained. These motors 64 need be only single-acting, for reasons later evident.

The apparatus may also include a box or panel 66 mounted within the shell 36 and wherein are housed or mounted control valves and other equipment later described. This box 66 is shown only diagrammatically in dotted lines in FIGURE 2. The box 66 has connections 68 for the two hoses 24 and 26 and from the box branch conduits 70, 72, 74, and 76 lead respectively to the packers 52, the gripper 62, a manifold 78 which supplies the motors 64, and the space between the packers, i.e., the testing chamber 54.

In use of apparatus involving this invention the carriage 34 is positioned within the bell end 16 of the pipe section 18 with the motors 64 retracted, as shown in FIGURE 2. After being placed in a predetermined axial position within the pipe section 18, as later explained, the packers 52 are inflated into engagement with the interior wall of the section 18 so that they will act as grippers to maintain the carriage 34 against any axial movement in the section. At the same time and while the reciprocating motors 64 are fully retracted, the gripper 62 likewise is inflated into engagement with the interior wall of the pipe section 18 to likewise maintain the slide 56 against any axial movement relative to the section. The hoses 24 and 26, which supply compressed air to the apparatus for the operation of the packers 52, the gripper 62 and the motors 64 and for testing a joint for leakage, are attached to the connections 68 on the box 66 and then extended outwardly through the spigot end 14 of the pipe section 18 and connected to controls, later described, on the vessel 22. Likewise, the retrieving line 28, i.e., a rope or cable, is attached to the carriage 34, as by the bridle 30, and is also streamed outwardly through the spigot end 14 of the pipe section 18 to an above water retrieving location.

With the testing apparatus thus in position the pipe section 18 then is lowered into appropriate position under water by any suitable apparatus (not shown) and is joined to the spigot end 14 of the pipe section 20, by being pushed thereover to compress the sealing ring 12, as shown in FIGURE 4.

The packers 52 then are vented to atmosphere so that they will relax and become disengaged from the interior wall of the pipe section 18, thereby freeing the carriage 34 for movement axially within the pipe sections 18 and 20 by operation of the single-acting motors 64. Air under pressure is then introduced into the motors 64 to extend the same so that, since the gripper 62 is still inflated to lock the slide 56 to the pipe section 18, the carriage 34 will be moved toward the pipe section 20 and into a position wherein the packers 52 will straddle the joint 32 between the two pipe sections. In this connection it will be seen that the apparatus is initially installed in the end 16 of the section 18 in a predetermined position so that subsequent operation of the motors 64 will position the packers 52 on opposite sides of a joint 32 between the sections 18 and 20. The packers 52 are then re-inflated into sealing engagement with the interior walls of the adjacent ends 14 and 16 of the pipe sections 20 and 18 to form the testing chamber 54 which includes, as a portion of the wall thereof, the joint 32 between the two sections. Fluid, such as air under pressure, then is admitted into the testing chamber 54 to test the joint 32 for leakage.

The test can be made merely by establishing a predetermined pressure in the chamber 54, and then observing a pressure gauge 80 connected thereto as later described to ascertain whether there is any pressure drop in the chamber which, of course, will indicate leakage through the joint 32. If leakage occurs, the joint 32 is repaired by suitable manipulation of the pipe section 18 and replacement, if necessary, of the sealing ring 12 prior to adding another section to the line 10.

After the test has been made, the packers 52 and gripper 62 are vented to atmosphere so that they will relax and release their engagement with the interior walls of the pipe sections 18 and 20. Thereupon, the entire apparatus can be pulled outwardly by the line 28, through the spigot end 14 of the pipe section 18 and thence up to the surface of the water for installation in another pipe section to be joined to the pipe section 18.

Preferably, after the pipe section 18 is connected to the section 20, the initial deflation of the packers 52, movement of the carriage 34 into a position wherein the packers straddle the joint 32, re-inflation of the packers to form a testing chamber 54 and introduction of air under pressure into the testing chamber, is accomplished automatically by apparatus, such as is shown, for example, diagrammatically in FIGURE 2. This apparatus, some of which may be mounted within the box 66 as indicated in FIGURES 2 and 4, includes a pair of conduits 82 and 84 adapted to have the hoses 24 and 26 respectively connected thereto, via the connections 68. At the surface control location, i.e., on the vessel 22, the hoses 24 and 26 are connected through manually-operable three-way valves 86 and 88, respectively, to a source of fluid under pressure, such as a manifold 90 which is supplied with fluid under pressure, as by a compressor 92. The valves 86 and 88 are adapted to connect their respective hoses 24 or 26 to the compressor 92, vent the hose to atmosphere while sealing off its connection to the manifold 92, or seal off both the hose and the manifold.

The conduit 82 is adapted to supply fluid under pressure to both of the packers 52, as by the branch conduit 70, and also to the gripper 62, as by the branch conduit 72. In this connection, a section of the conduit 72 adjacent the slide 56 is flexible for obvious reasons. Interposed between the conduit 82 and the branch 70 is a two-way valve 92 which in one position establishes communication between the conduit 82 and the branch 70, and in the other position shuts off such communication and vents the branch 70, together with the packers 52, to atmosphere. The valve 92 is controlled by a reciprocating pneumatic motor 94 which may have its piston rod 96 connected to the valve 92 by a mechanical linkage 98. A spring 100 constantly urges the piston rod 96 of the motor 94 into a position wherein the valve 92 establishes the aforedescribed communication, while the application of fluid under pressure to the motor 94 will move its piston rod in the opposite direction to thereby move the valve 92 into a position wherein the packers 52 will be vented to atmosphere.

The conduit 84 is adapted to supply fluid under pressure to the packer-positioning motors 64 via the branch conduit 74, to the pneumatic motor 94 via a branch conduit 102, and to the testing chamber 54 via the branch conduit 76. Connected into the branch conduit 102 is a two-way valve 104 which in one position is adapted to permit the passage of fluid through the conduit to the motor 94, and in its other position is adapted to vent the motor 94 to atmosphere while preventing the passage of fluid through the branch conduit 102 to the motor. The valve 104 normally is urged, as by a spring 106, into its position which permits passage of fluid through the branch 102 to the motor 94, but is moved to its other motor-venting position, as by the mechanical interengagement of an arm 108 on the valve 102 by an arm 110 on the slide 56 projecting through a slot 112 in the shell 36, when the motors 64 are extended to move the carriage 34 from its initially-installed position to its position wherein the packers 52 straddle the joint to be tested. Interposed between the conduit 84 and the branch conduit 76 is a check valve 114 which normally prevents the passage of fluid through the branch conduit 76 to the testing chamber 54. The valve 114 is adapted to be opened, however, by a pneumatic piston and cylinder arrangement 116 that is supplied with fluid under pressure from the branch conduit 70 via a branch conduit 118.

The operation of the apparatus is as follows:

After the testing apparatus has been installed in the end 16 of the pipe section 18, the valve 86 is operated to admit fluid under pressure into the hose 24 to inflate the packers 52 and the gripper 62. At the same time, the valve 88 is operated to vent the hose 26 and conduit 84 to atmosphere and prevent the flow of fluid under pressure from the manifold 90 through the valve 88. Therefore, spring 100 positions the pneumatic motor 94 so that the valve 92 permits passage of fluid to the packers 52. The valve 86 is then turned to the position shown in FIGURE 2, wherein both the hose 24 and manifold 90 are sealed off. Therefore, pressure is maintained in the packers 52 and the gripper 62 so that they will remain inflated and maintain the apparatus in its installed position within the pipe section 18, as shown in FIGURE 2.

The pipe section 18 is then lowered under water and joined to the pipe section 20. After the joint 32 has been made, the valves 86 and 88 are turned to their positions which admit fluid under pressure from the manifold 90 into the hoses 24 and 26. Such pressure fluid will operate the motor 94 to move the valve 104 so as to vent the packers 52 to atmosphere. At the same time fluid under pressure will be supplied to the motors 64, so that as soon as the packers 52 release their engagement with the interior wall of the pipe section 18, the motors 64 will move the carriage 34 into a position wherein the packers will straddle the joint 32 between the two pipe sections 18 and 20. Movement of the carriage 34 into this joint-straddling position interengages the arms 110 and 112 and operates the valve 104 to vent the motor 94 to atmosphere. Consequently, the spring 100 will move the valve 92 into a position to resupply fluid under pressure to the packers 52. As the packers 52 re-inflate, fluid under pressure will also be supplied to the piston and cylinder arrangement 116 through the branch conduit 118, so that when the packers are up to pressure and seal with the interior walls of the pipe sections 18 and 20, the check valve 114 will be opened to admit fluid under pressure to the testing chamber 54. When the pressure in the chamber 54 becomes stabilized, as by watching the pressure gauge 80 connected to the hose 26 at the control point, the valve 88 is moved into a shut-off position to maintain the pressure in the hose 26, and hence, in the testing chamber. Consequently, any leakage through the joint 32 will cause a pressure drop that will be reflected on the pressure gauge 80.

After the test has been made, both valves 86 and 88 are moved into a position to vent both hoses 24 and 26 to atmosphere so that the packers 52 and the gripper 62 will be deflated. Whereupon, the entire apparatus can be retrieved by the cable 28.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus for testing a pipe joint for leakage comprising: carriage means disposable within an end of a pipe section; a pair of spaced expansible packers carried by said carriage means and defining therewith, and with the interior wall of a pipe when engaged therewith, a closed testing chamber; holding means movable relative to said carriage means and releasably engageable with the interior wall of a pipe to prevent movement of said carriage longitudinally thereof; power-operated extensible means connected to said carriage means and to said holding means for effecting relative movement therebetween longitudinally of a pipe when disposed therewithin; and conduit means carried by said carriage means for introducing air under pressure into said testing chamber, whereby said carriage and holding means can be disposed within the end of a first pipe section, said end connected to a second pipe section, said holding means engaged with the first section, said power-operated means operated to move said carriage means into a position wherein said packers are positioned on opposite sides of the joint between the first and second sections, said packers engaged with the sections to define a testing chamber, and air under pressure introduced into the chamber to test the joint for leaks.

2. The structure defined in claim 1 wherein the holding means comprises at least one hollow inflatable element, the packers comprise inflatable rings, and the power-operated means comprises a reciprocating fluid motor.

3. The structure defined in claim 2 including first manually-operable valve means for selectively controlling the supply of pressure fluid to the holding means and the packers, second manually-operable valve means for controlling the supply of pressure fluid to the motor and to the testing chamber, and automatically-operable valve means responsive to the supply of pressure fluid by said second valve means and to separating relative movement between the holding means and the carriage means for first venting said packers to atmosphere while maintaining pressure in said holding means so that the supply of pressure fluid to said motor moves said packers into joint-straddling position, and then resupplying said packers when in joint-straddling position with fluid under pressure to expand said packers and define the testing chamber.

4. The structure defined in claim 3 including check valve means in the conduit means normally preventing the introduction of pressure fluid into the testing chamber, and means responsive to a predetermined pressure in the packers for opening the check valve means.

References Cited in the file of this patent

UNITED STATES PATENTS

| | | |
|---|---|---|
| 2,481,013 | Henderson | Sept. 6, 1949 |
| 2,652,717 | Bush et al. | Sept. 22, 1953 |
| 2,731,827 | Loomis | Jan. 24, 1956 |
| 2,782,370 | Ver Nooy | Feb. 19, 1957 |